United States Patent Office 3,457,139
Patented July 22, 1969

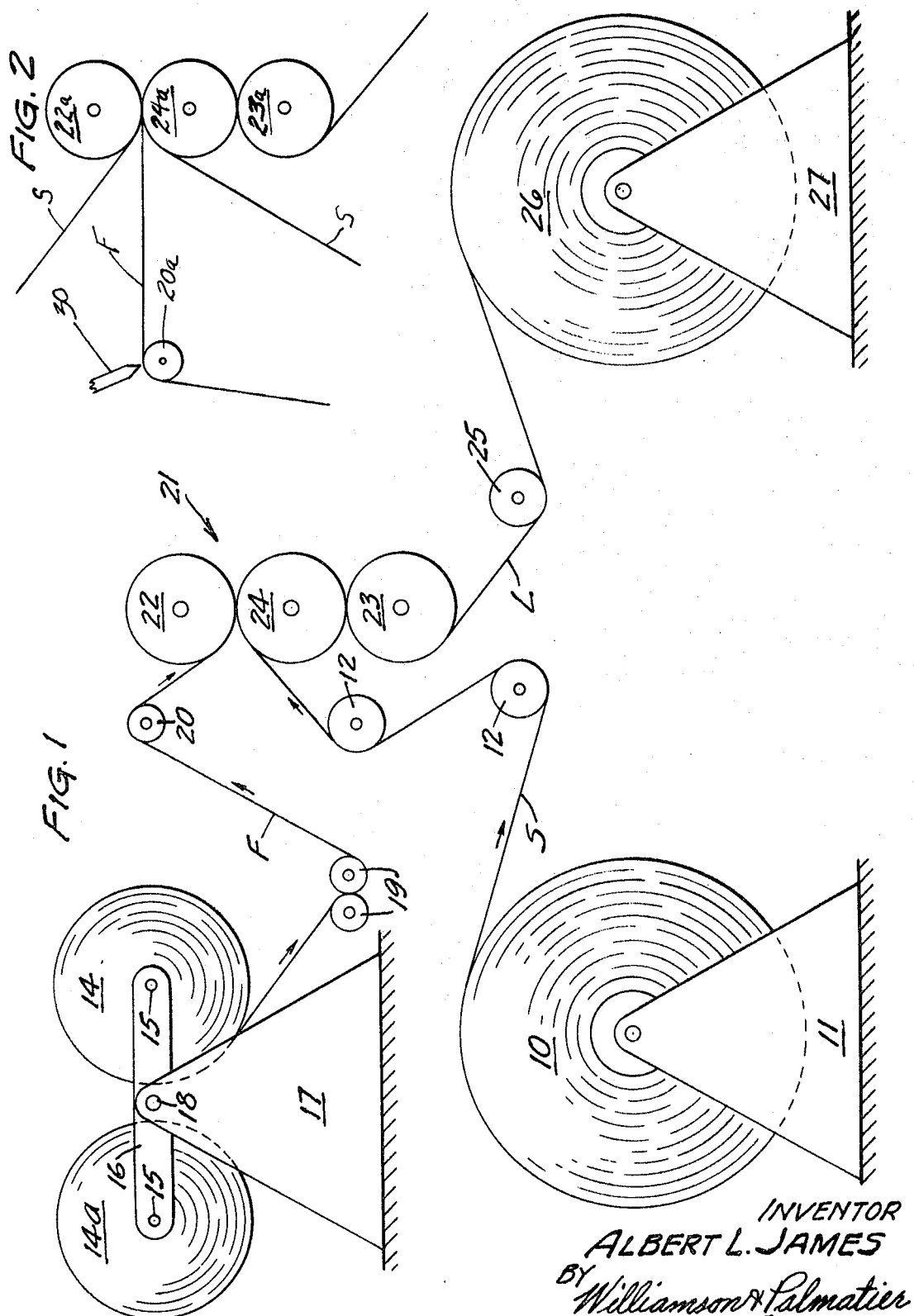

3,457,139
UNHEATED DRY LAMINATION PROCESS FOR PRODUCING LAMINATIONS FROM THERMOPLASTIC AND SUBSTRATES
Albert L. James, 928 E. Main St., Anoka, Minn. 55303
Filed Jan. 19, 1966, Ser. No. 521,636
Int. Cl. B32b 31/08, 27/32, 27/08
U.S. Cl. 161—247               10 Claims This invention relates to a laminated article and process for producing the same from thermoplastic films and substrates.

In my copending application, Ser. No. 378,491, filed June 29, 1964 now Patent No. 3,360,412, a dry lamination process was disclosed in which a thermoplastic film is heat sealed to a substrate sheet formed of a material dissimilar to the thermoplastic film. In this process, no additive type adhesives or bonding agents were used and the thermoplastic film was maintained in a dimensionally stable condition until the film was brought into contact with the substrate sheet. This heat sealing of the film to the substrate was accomplished by preheating the substrate to a temperature corresponding to the heat sealing temperature of the thermoplastic film prior to compressing the film and substrate sheet into intimate contacting relation so that the heat for the heat sealing operation was supplied by the substrate.

An object of this invention is to provide a dry lamination process and the product produced thereby, wherein a thermoplastic film is bonded to a substrate without the use of additional adhesives or bonding agents, and without the application of external heat during the laminating operation. Specifically the thermoplastic film and substrate sheet are bonded together at temperatures less than the fusion temperature of the thermoplastic material by urging the film and substrate sheet into intimate contacting relation with intense pressures so that a mechanical bond is formed at the interfacial surfaces of the film and substrate sheet. The laminating operation may be carried out at room temperature if desired and the thermoplastic film may be selected from any number of suitable thermoplastic materials although the process is ideally suited and is preferred that a polyolefin be selected as the film material. Similarly, the substrate sheet may be any of the conventional sheets of material used in the formation of commercial packages since the film and substrate sheet may be bonded together either through a chemical bonding or a combination chemical and mechanical bonding. In the event that a smooth surface substrate such as glassine, foil and cellophane are used, the substrate sheet and a film will be bonded together primarily by means of chemical bonding therebetween. Alternatively, in the event that a substrate sheet having interstices in the interfacial surfaces thereof a combination of chemical and mechanical bonding will be effected between the lamina.

FIG. 1 is a diagrammatic illustration of one novel system which may be used in carrying out the steps of the present process.

FIG. 2 is a fragmentary diagrammatic illustration showing a slight modification of the system illustrated in FIG. 1.

In practicing the present process, a film of thermoplastic material is bonded to a suitable substrate formed of a different material from the thermoplastic film. The film may be selected from any number of thermoplastic materials although the present process is ideally suited for polyolefin film and specifically polyethylene. In the event that a polyolefin film such as polyethylene film, be used as the thermoplastic material, one surface of the film will require treatment for the purpose of rendering such polar to permit bonding thereof with the substrate. The polyolefin film surface may be treated to render the same polar by the corona discharge method wherein the surface be treated as exposed to a corona discharge, or the surface may be treated by a gas flame oxidation method, both methods being well known in the art as shown by the Traver Patent No. 3,018,189, and the Kritchever Patent No. 2,648,097 or Kreidl Patent No. 2,632,921. Treatment of one surface of the polyolefin film is treated to render the same polar, it is thought that this treatment results in the creation of reactive surface groups which either form secondary bonds with surface groups on the substrate or enter into completed reactions with surface groups on the substrate. When one or more surfaces of a polyolefin film have been treated by exposure to an electrical discharge or oxidizing gas flame surface treatment process, the surface is rendered chemically reactive although the stereo chemistry of the surface thus exposed is not yet specifically known.

The substrate may be formed from any of the materials used in the package field such as kraft paper, paperboard, uncoated cellophane, one side coated cellophane, glassine paper, sulphite paper, ground wood sheet, various foils, metal sheets and other packaging materials. However, it is pointed out that the present process is ideally suited for bonding the thermoplastic film to a substrate which has interstices in a surface thereof such as the papers and paperboards recited. When the substrate has interstices in one surface thereof, the thermoplastic film will not only form a chemical bond with the substrate, but the film will cold flow into these interstices and form a highly effective mechanical bond as well as chemical bond of greater contact area. In some instances, the substrate may be formed of a thermoplastic material which has either different physical or chemical properties than the thermoplastic material from which the film is formed, and which also has one surface thereof which has an affinity for the polar surface of the thermoplastic film. Therefore, when the thermoplastic film is selected one surface thereof must be polar and one surface of the substrate must have an affinity for the polar surface of the thermoplastic film.

In the present process since the bonding is carried out without the application of external heat or at a temperature less than the heat sealing or fusion temperature of the thermoplastic film, it is necessary to use sufficient pressures to cause intimate contacting of the polar surface of the film and the affinity surface of the substrate sheet. Therefore the thermoplastic film and substrate sheet are brought into contacting relation at a pressure sufficient to expell most of the air between the interfacial surfaces of the lamina thereby permitting the necessary contacts to allow chemical bonding to take place. This pressure is produced by a roller assembly which permits continuous feeding of the film and substrate sheet into the nip thereof. With respect to the specific pressure exerted by the roller assembly, it has been found to be exceedingly difficult to measure the nip pressure in pounds per square inch, but experiments and tests seem to indicate that a nip pressure of about a 100 pounds per linear inch of nip minimum is required to bring about the pressures to cause chemical bonding.

When polyolefin is used as a thermoplastic film, it is necessary to select a film which has no slip agent additive or anti-blocking agent additive since these additives exude to the surface and would interfere with the surface group of the film being brought into sufficient intimate contact with the surface groups of the substrate sheet to permit the necessary chemical bonding to take place. Also as pointed out above, when the film is formed of a polyolefin material, it is also necessary to treat one surface of the film to render the same polar either by the gas flame oxidation method or the corona discharge method. It is also preferred that the laminate be allowed to age for at least a day when the bonding is carried out at room temperature in order to allow the chemical bonding and reaction to go to completion. Alternatively, the laminate may be passed through a heating medium having a temperature, for example, of 150° F. to expedite the chemical bonding phenomena. To this end, it will be noted that temperatures of this order are substantially less than the heat sealing or fusion temperatures of the thermoplastic film such as polyolefin films.

Referring now to the drawing it will be seen that one apparatus system for carrying out the steps of the present laminating process is shown. The substrate S is unwound from a roll 10 which is suitably revolvably mounted upon a supporting structure 11. The substrate is trained about suitable spreader idler rolls 12, the specific construction of these spreader idler rolls being determined in part by the specific substrate being processed. Although it is necessary to use a tensioning or spreading device for tensioning the thermoplastic film, it is unnecessary in many instances to provide a tensioning device for unwinding the substrate sheet although such a tensioning device may be used when desired.

The thermoplastic film F is unwound from a roll 14 which is also suitably revolvably mounted upon one of a pair of shafts 15 carried by a swingably mounted support arm 16 which in turn is pivoted by a pivot 18 to a turret type unwind stand 17. It will be noted that while the roll 14 of thermoplastic material is being unwound from the unwind turret stand, another roll 14a is mounted upon the other shaft 15 which may be spliced to the film of the other roll in a procedure known as the flying splice thereby permitting continuous operation of the unwind turret stand or structure 17. The film is also fed to the laminating roll assembly and it is pointed out that it is desirable to equip the apparatus with a delicate adjustably constant tension device of well known construction so that the film will be delivered to the laminating nip under uniform tension conditions. It is further essential to provide the apparatus with an edge guide for the film so that the film is maintained in constant alignment with the substrate during the laminating operation as well as proper spreader devices such as "Mount Hope," slat, or herringbone rolls.

The film F is passed between a splicing nip comprised of a pair of splicing nip rolls 19, which permit the film from one roll to be spliced to the film of another roll during operation of the apparatus. The splicing nip rolls also serve as an effective constant tension unwind device, if for example the splicing nip rolls are driven from the laminating roll assembly. In the present apparatus, it is preferred that the splicing nip rolls in fact be driven from the laminating roll assembly.

The film F is also trained over an idler spreader roll 20 which serves to deliver the film F to the laminating nip of the laminating roll assembly in a wrinkle-free condition. This spreader roll 20 may be constructed in the manner of the idler spreader rolls 12 and therefore be of herringbone construction. However, in some instances it is desirable to power drive the spreader roll and in such instances the spreader roll may be a driven "Mount Hope" roll or alternatively the spreader roll may be a driven expanding slat roll each of these roll structures being well known in the art.

The film and substrate are simultaneously fed into the laminating roll assembly designated generally by the reference numeral 21 which as shown is comprised of a pair of outer rolls 22 and 23 respectively and a center roll 24 which is disposed in bearing contact with the outer rolls. It is pointed out that the laminating roll assembly illustrated is similar to the conventional three roll paper polishing calender stack although other roll arrangements may be used if desired. It is preferred though that at least three rolls be utilized in the laminating roll assembly providing at least two nip areas for carrying out the laminating operation.

The outer rolls 22 and 23 are preferably hardened steel shells having a polished chrome finish and cored for water cooling to control the heat build up which occurs during the bonding operation and application of pressure causing "cold" flow. The center roll 24 is preferably constructed of hard pressed fibers, hard rubber, nylon, and the like although it may also be formed of a suitable metal. Since the rolls of the laminating roll assembly are in bearing contact with each other, it is preferred that only the center roll 24 be provided with drive connections, the other rolls being driven from the center roll.

The pressure exerted by the rolls as pointed out above must be at least 100 pounds per linear inch of nip although it is preferred that higher pressures be used for most operations such as 300 pounds per linear inch of nip and sometimes 500 pounds per linear inch of nip or even higher dependent upon the materials being processed and the "hardness" of the center roll. When thermoplastic film is bonded to glassine paper, the paper will be fed to the laminating roll assembly prior to its being calendered and it will be seen that the laminating roll assembly will not only serve to bond the film and substrate paper together, but it also serves to simultaneously calender the glassine paper to its smooth finish. Similarly, other unsmooth surfaced substrates will be simultaneously calendered during the lamination operation. This process will also work on precalendered paper.

When substrate sheets having interstices in the surfaces thereof, such as kraft paper, uncalendered glassine paper and the like, the pressures exerted at the nip area are sufficient to cause the film F to cold flow, even while in its extremely viscous solid state, into the interstices of the substrate sheet thereby producing a highly effective mechanical bond and facilitating initiation and completion of the chemical bonding therebetween. As pointed out above, the temperature of the system is maintained at substantially less than the fusion or heat sealing temperature of the thermoplastic film. It is desirable to allow the laminate to age if the lamination operation is carried out at approximately room temperature conditions.

The laminate L is thereafter trained over an idler spreader roll 25 similar in construction to the spreader rolls 12 and is finally wound upon a rewind spool to form a roll 26 which is suitably carried by a rewind stand 27. In the event that a polyolefin film is used, only one surface of the film will be treated to render this surface polar, the other surface of the film being left in the untreated condition. The treated surface of the film will be bonded to the substrate sheet thus leaving the untreated surface of the film exposed. Since the untreated surface of the film is that surface which will be trained over the various rollers and parts of the system, there will be absolutely no tendency of this film surface to stick to these parts. Similarly the untreated surface will not tend to block or stick when the laminate is wound to the roll 26, the untreated surface constituting one surface of the laminate.

With respect to the treatment of the surface of polyolefin film, one surface of the film may be pretreated or suitable treatment apparatus may be incorporated in the present apparatus. If treatment apparatus or mechanism is provided, this treatment mechanism may be positioned at any suitable location between the unwind stand and the laminating roll assembly. Although no additional additive such as bonding agents or adhesives are used in the present system, various kinds of paper may be provided with sizing agents if desired.

Laminates produced in accordance with the present process have been found to be superior to laminates formed by extrusion coating. In extrusion coating, the thermoplastic material is necessarily heated to relatively high temperatures and these temperatures result in surface oxidation of the thermoplastic material. With heat sealed poly coating to poly coating it has been found that the heat sealing temperatures of laminates formed by the extrusion coating process, because of the surface oxidation, are not uniform and are consistently much higher than the heat sealing temperatures of the laminates formed in accordance with the present process. Laminates formed in accordance with the present process also do not have the objectionable odors associated with laminates formed through extrusion coating.

Laminates formed by extrusion coating also tend to curl since the thermoplastic material is extruded at extremely high temperatures upon unheated substrates which have a different coefficient of expansion than the thermoplastic material. Thereafter upon cooling, there is a substantial amount of shrinkage of thermoplastic material relative to the substrate sheet thus resulting in highly objectionable curling. The present process, however, being carried out at relatively low temperatures does not experience the objectionable curling and the thermoplastic lamina will heat seal to itself at substantially lower and uniform temperatures than that of extrusion coating laminates. Although thermoplastic materials in general have a wide range of fusion or heat sealing temperatures, data has been compiled to indicate a difference in heat sealing temperatures of laminates formed by the present process and that of laminates formed by extrusion coating in which the thermoplastic film constitutes polyethylene. The data indicates that the polyethylene lamina of a laminate produced in accordance with the present process will heat seal consistently poly to poly at a percentage lower temperature than that of the polyethylene lamina of an extrusion coating laminate. This is believed to be due to the fact that there is surface oxidation of the exposed surface of the polyethylene which is caused by the high temperatures while in the present process, no such surface oxidation occurs since the lamination is carried out at relatively low temperatures.

The tensioning device 19 is not only arranged and constructed to tension the film for the purpose of removing wrinkles but cooperates with other elements of the system to cause sufficient stretching of the film so that printing thereon can be stretched to the desired size. Stretching of the film to produce a desired stretching of printing thereon may be accomplished in the same manner as that described in my copending application, Ser. No. 378,491, filed June 29, 1964. The printing will be printed short or undersized and will be stretched before it is laminated to the substrate. It is also pointed out that the particular ink selected will have the properties which will adhere to the substrate when pressed into contacting relation with it.

Referring now to FIG. 2 a slight modification of the system illustrated in FIG. 1 is shown which permits lamination of more than two laminae and specifically the lamination of two substrate sheets to a single polyolefin film. Referring now to FIG. 2 it will be seen that the polyolefin film F is trained over an idler roll 20a which has a surface formed of dielectric material. The substrate S is fed into the laminating roll assembly which includes two outer rolls 22a and 23a and center roll 24a all of which are identical in construction and operation to the rolls 22, 23 and 24 of the laminating roll assembly of FIG. 1.

The film F may be obtained commercially with one surface thereof treated either by a gas flame oxidation method or an electrical corona discharge method as pointed out above. However, since a substrate sheet is to be bonded to both of the surfaces of the polyolefin film, it is necessary to treat the untreated surface of the film in order to permit lamination of the substrate sheets thereto. Therefore, a treatment means such as the electrode mechanism 30 is positioned in close proximity to the untreated side of the surface of the film F to subject the film to electron bombardment and to render the side polar. It is also pointed out that in the event the film F has neither surface thereof treated, a second electrode mechanism may be positioned to treat the other side of the film just prior to passage of the film into the laminating nip.

It will be seen from the foregoing paragraphs in the present process, it is preferred that the substrates used are of the type which are normally commercially available and require no special pretreatment for this process. It is pointed out that the present process also contemplates the use of thermoplastic film which may be bonded in an unheated condition to the substrate sheet without the use of adhesive or bonding agent additives.

Thus it will be seen that I have provided a novel and unique process for forming a laminate from a thermoplastic film and a substrate sheet which has superior qualities to laminates formed in heretofore known comparable techniques.

It will, of course, be understood that various changes may be made in the form, details, arrangement and proportion of the various parts without departing from the scope of my invention.

What is claimed is:

1. A process for producing a sealed lamination from a film of thermoplastic material having one surface thereof which has been rendered chemically reactive by exposure of said one surface to an oxidizing gas flame surface treatment process to increase the reactive surface groups of the film, and a substrate sheet formed of a material dissimilar from said thermoplastic film, said substrate sheet having a surface which has an affinity for the polar surface of said film, said process comprising positioning said film and substrate whereby said affinity and polar surfaces thereof are disposed in opposed relation, applying pressure to said film and substrate sheet by a pressure applying medium so that the polar surface of said film intimately contacts the affinity surface of said substrate under a pressure adeqaute to expel substantially all of the air between said film and substrate and to thereby permit permanent chemical bonding of the interfacial surfaces of the film and substrate to subsequently occur, the temperature of said film and substrate being less than the heat sealing temperature of said thermoplastic film but not substanially greater than 150° F. during the application of pressure.

2. In the process for producing a sealed lamination from a film of thermoplastic material having one surface thereof which has been renderd chemically reactive by exposure of said one surface to an electrical corona discharge process to increase the reactive surface groups on the film, and a substrate sheet formed from a material dissimilar from said thermoplastic film, and having a surface which has an affinity for the polar surface of said film, said process comprising, continuously moving said film and substrate through a predetermined path of travel passing the substrate and film between a pair of pressure applying rolls so that the polar surface of said film intimately contacts the affinity surface of said substrate at a nipping area adequate to expel substantially all of the air between said film and substrate and to thereby cause chemical bonding between the interfacial surfaces of said film and substrate, the temperature of said film and substrate when passed between the pressure applying rolls being less than the heat sealing temperature of said thermoplastic film but not substantially greater than 150° F.

3. The process as defined in claim 2 wherein said film of thermoplastic material comprises a polyolefin film.

4. The process as defined in claim 2 wherein said film of thermoplastic material comprises a polyethylene film.

5. The process as defined in claim 2 wherein the pressure exerted by the pressure applying rolls is at least 100 pounds per linear inch of nip.

6. The process as defined in claim 2 wherein said affinity surface of the substrate has a plurality of interstices therein whereby when the film and substrate are moved between the pressure applying rolls, the thermoplastic material will flow into the interstices so that a mechanical bond is produced between the interfacial surfaces of the film and substrate in addition to the chemical bonding therein.

7. In a continuous process for producing a multiply sealed lamination from a polyethylene film having non-polar surfaces, and a pair of substrate sheets formed of material dissimilar from said polyethylene film, said process comprising continuously moving said polyethylene film and said substrate sheets through predetermined paths of travel, said polyethylene film having the respective surfaces thereof rendered chemically reactive by exposure of said surfaces to an electrical corona discharge process to increase the reactive surface groups of the film and therefore capable of chemical and mechanical bonding with material dissimilar to the polyethylene film, passing the substrate sheets and film through a pressure applying medium whereby the film is positioned between the substrate sheets so that each substrate sheet intimately contacts one surface of the film at a nipping area adequate to expel substantially all of the air between said film and substrate sheets and to thereby permit chemical bonding between the interfacial surfaces of said film and substrate sheets, the temperature of said polyethylene film and substrate sheets when passed through the pressure applying medium being less than the fusion temperature of said polyethylene film but not substantially greater than 150° F.

8. A sealed laminated structure having no additive bonding substance according to the process of claim 2, said laminating structure comprised of at least two chemically united laminate, one of which comprises a film of polyolefin material and the other lamina comprising a substrate sheet formed of material dissimilar from said polyolefin film, the chemical bond between the polyolefin film and the substrate comprising surface groups of the polyolefin film, produced by exposure of the surface of the film to an electrical corona discharge, which polyolefin film surface groups have chemically reacted with surface groups of the substrate, said laminated structure having less tendency to curl than extrusion coated products and other dry lamination products produced with attendant heating, the moisture content of the substrate sheet not being diminished in the formation of the laminated structure whereby the moisture content of the substrate sheet is substantially the same in the laminated structure as it was prior to being laminated to the polyolefin film.

9. The laminates structure as defined in claim 8 wherein said polyolefin film comprises an oriented polyolefin film which has much greater strength than non-oriented or stress relaxed polyolefin film so that said laminating structure has a higher tear strength, a higher burst strength, and a higher tensile strength than extrusion coated products and other dry lamination products which are heated to a temperature and for a dwell time sufficient enough to produce relaxation or non-orientation of the film.

10. The process as defined in claim 2 wherein said sealed lamination is disposed in an environment at a sufficient temperature and for a sufficient period of time to permit said chemical bonding between the film and substrate to go to completion.

References Cited

UNITED STATES PATENTS

| | | | |
|---|---|---|---|
| 3,054,708 | 9/1962 | Steinberg | 156—1 |
| 3,081,214 | 3/1963 | Strome | 156—272 |
| 3,159,520 | 12/1964 | Harrison et al. | 156—272 |
| 3,171,539 | 3/1965 | Holbrook et al. | 156—306 X |
| 3,190,781 | 6/1965 | Metz | 156—244 |
| 3,282,833 | 11/1966 | Pfeffer | 204—168 |
| 2,632,921 | 3/1953 | Kreidl | 18—47.5 |
| 2,648,097 | 8/1953 | Kritchever | 18—47.5 |
| 3,018,189 | 1/1962 | Traver | 117—47 |
| 3,196,063 | 7/1965 | Paquin et al. | 161—250 |
| 3,281,347 | 10/1966 | Winder | 204—168 |
| 3,329,549 | 7/1967 | Vilutis | 156—272 |

EARL M. BERGERT, Primary Examiner

D. J. FRITSCH, Assistant Examiner

U.S. Cl. X.R.

156—82, 272, 324